United States Patent [19]
Onodera et al.

[11] Patent Number: 5,596,138
[45] Date of Patent: Jan. 21, 1997

[54] AIR-TIGHTNESS TESTING ARRANGEMENT FOR ELECTRIC DEVICES

[75] Inventors: Tsugio Onodera; Shigeru Takei, both of Gunma-ken, Japan

[73] Assignee: Mitsuba Electric Mfg. Co., Ltd., Gunma-ken, Japan

[21] Appl. No.: 552,837

[22] Filed: Nov. 3, 1995

[30] Foreign Application Priority Data

Nov. 14, 1994 [JP] Japan ................... 6-304291

[51] Int. Cl.⁶ ................. G01M 3/28; H01R 9/16
[52] U.S. Cl. ..................... 73/49.2; 73/49.7
[58] Field of Search ............ 73/49.2, 52, 49.7, 73/40.7, 40

[56] References Cited

FOREIGN PATENT DOCUMENTS 446182  9/1991  European Pat. Off. ............... 73/49.7

Primary Examiner—Hezron E. Williams
Assistant Examiner—Daniel S. Larkin
Attorney, Agent, or Firm—Skjerven Morrill MacPherson Franklin & Friel; Alan H. MacPherson; Thomas S. MacDonald

[57] ABSTRACT

In an arrangement for testing air-tightness of an electric device having an enclosed housing, and an electric connector fitted into an opening provided in the housing, the electric connector is provided with a communication hole for communicating the interior of the electric device with the exterior, and the communication hole is adapted to close when two halves of the connector are coupled with each other. Thus, the air-tightness of electric device can be conducted when the assembly work is substantially finished whereas the conventional arrangements require an additional assembly work step which could be a potential cause for loss of air tightness. Furthermore, the present invention can be implemented simply by providing a small communication hole in the electric connector and an associated sealing arrangement without requiring any change to the existing device to be tested.

4 Claims, 3 Drawing Sheets

AIR-TIGHTNESS TESTING ARRANGEMENT FOR ELECTRIC DEVICES

TECHNICAL FIELD

The present invention relates to an air-tightness testing arrangement for electric devices which are provided with an electric connector. The "electric devices" are herein meant as devices which require an electric connection to an external circuit, and the electric connection may be either for supplying electric power to the device from or transmitting electric signals into and/or out of the device.

BACKGROUND OF THE INVENTION

Electric devices are often provided with air-tight structures to prevent internal components from being affected by moisture and other foreign matter. Such devices therefore need to be tested after assembly if they are indeed air-tight, typically by introducing pressurized air into the interior of the device, and then detecting any drop in the internal pressure over time.

FIG. 3 shows an electric power steering (EPS) device 20 of a rack and pinion type for automotive use which is given as an example of the electric device whose air-tightness is desired to be tested. This EPS device 20 comprises a motor housing 21a, a gear housing 21b, a rack shaft 23 extending axially through the motor housing 21a and the gear housing 21b in an axially slidable manner, and a hollow motor rotor 22 which is rotatably fitted onto the rack shaft 23 in the motor housing 21a and engages the rack shaft 23 via a ball screw mechanism not shown in the drawing. Thus, the output torque of the motor rotor 22, which is received in the motor housing 21a, is converted into the axial thrust of the rack shaft 23. In the gear housing 21b, a pinion attached to a steering shaft 24 meshes with a rack of the rack shaft 23 so that the steering effort applied to the steering wheel, which is attached to the steering shaft 24, is assisted by the thrust of the rack shaft 23 produced by the motor rotor 22.

When testing this EPS device 20 for its air-tightness, conventionally, pressurized air is introduced into the interior of the EPS device 20 from a rack guide mounting hole 25, which is provided in a side wall of the gear housing 21b originally for the purpose of fitting a rack guide (not shown in the drawing) therein along with a compression coil spring (not shown in the drawing). The rack guide applies a biasing spring force to the rack shaft 23 to control the force with which the pinion of the steering shaft 24 meshes with the rack, and this spring force can be adjusted by a screw 26 threadably received in the rack guide mounting hole 25.

In the assembled state of the EPS device 20, the rack guide mounting hole 25 is closed off by the screw 26 with the aid of an O-ring fitted in an annular groove formed around the screw 26. When conducting an air-tightness test, after the screw 26 is removed from the rack guide mounting hole 25 or when the EPS device 20 is fully assembled with the exception of the screw 26, a testing head (not shown in the drawing) is fitted into the rack guide mounting hole 25. Pressurized air is introduced into the housing of the EPS device 20 from the testing head. When a prescribed pressure is achieved in the housing of the EPS device 20, the supply of the pressurized air is discontinued, and the internal pressure of the EPS device 20 is measured if there is any drop in the internal pressure of the EPS device housing. Upon completion of the test, the testing head is removed, and the screw 26 is threaded into the rack guide mounting hole 25. Therefore, even when favorable test results are obtained, if the screw 26 is not properly threaded into the rack guide mounting hole 25, or the O-ring is dislodged from the annular recess formed around the screw 26, the housing of the EPS device 20 would not be air-tight in spite of satisfactory test results. This can be prevented by using a relatively large O-ring, and/or by using utmost care when threading the screw 26 into the rack guide mounting hole 25, but it will increase the cost for producing the EPS device.

BRIEF SUMMARY OF THE INVENTION

In view of such problems of the prior art, a primary object of the present invention is to provide an air-tightness testing arrangement for electric devices which can be carried out after the devices are fully assembled so that one can eliminate any additional assembly work step after the test which could be a potential cause for impairing the air-tightness of the electric devices.

A second object of the present invention is to provide an air-tightness testing arrangement for electric devices which requires minimal modification to the electric devices.

A third object of the present invention is to provide an air-tightness testing arrangement for electric devices which can be applied to most electric devices as long as they are provided with an electric connector or the like.

According to the present invention, these and other objects can be accomplished by providing an arrangement for testing air-tightness of an electric device having an enclosed housing, and an electric connector fitted into an opening provided in the housing, the connector comprising: a housing-end connector half having a casing which is fitted into the opening provided in the housing of the electric device in an air-tight fashion, a connecting pin extending between inner and outer ends of the housing-end connector half casing, and a communication passage passed through between inner and outer ends of the housing-end connector half casing; a cable-end connector half having a casing which is adapted to be coupled with the housing-end connector half casing in an air tight fashion, a cooperating terminal retained in the cable-end connector half casing and adapted to be electrically connected to an outer end of the connecting pin when the two housing halves are coupled with each other, and lead means for establishing external electric connection to the cooperating terminal; and seal means for closing the communication passage when the two casings of the connector halves are coupled with each other.

By using this arrangement, air-tightness of an electric device can be tested by following the steps of: fitting a testing head having an external configuration corresponding to the cable-end connector half and connected to a source of compressed gas into the housing-end connector half; introducing compressed gas into the housing of the electric device from the testing head until a certain internal pressure is achieved in the housing of the electric device; measuring an internal pressure of the housing of the electric device over a prescribed time period, and evaluating air-tightness of the housing of the electric device according to a change in the internal pressure; and removing the testing head from the housing-end connector half, and coupling the cable-end connector half with the housing-end connector half.

Thus, the air-tightness of electric devices can be conducted when the assembly work is substantially finished whereas the conventional arrangements require an additional assembly work step which could be a potential cause for loss of air tightness. Furthermore, the present invention can be implemented simply by providing a small communication hole in the electric connector and an associated sealing arrangement without requiring any change to the existing devices to be tested.

According to a preferred embodiment, the casing of one of the connector halves comprises: a cavity opposing the other one of the casings, the other casing being provided with a first projection adapted to be fitted into the cavity; and a second projection having a substantially identical cross sectional profile to the first projection and adapted to align with and abut the first projection in the cavity when the two casings are coupled with each other, the seal means consisting of an annular resilient member which is received in the cavity to be fitted over both the annular projection and the projection when the two casings are coupled with each other. Thus, an inexpensive minor modification to the connector allows the present invention to be implemented without substantially increasing the fabrication cost for the electric devices. By providing an opening in one of the casings for allowing the presence of the seal means to be inspected from the exterior, inadvertent omission of the seal means can be avoided, and the reliability of the electric devices can be thereby improved.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
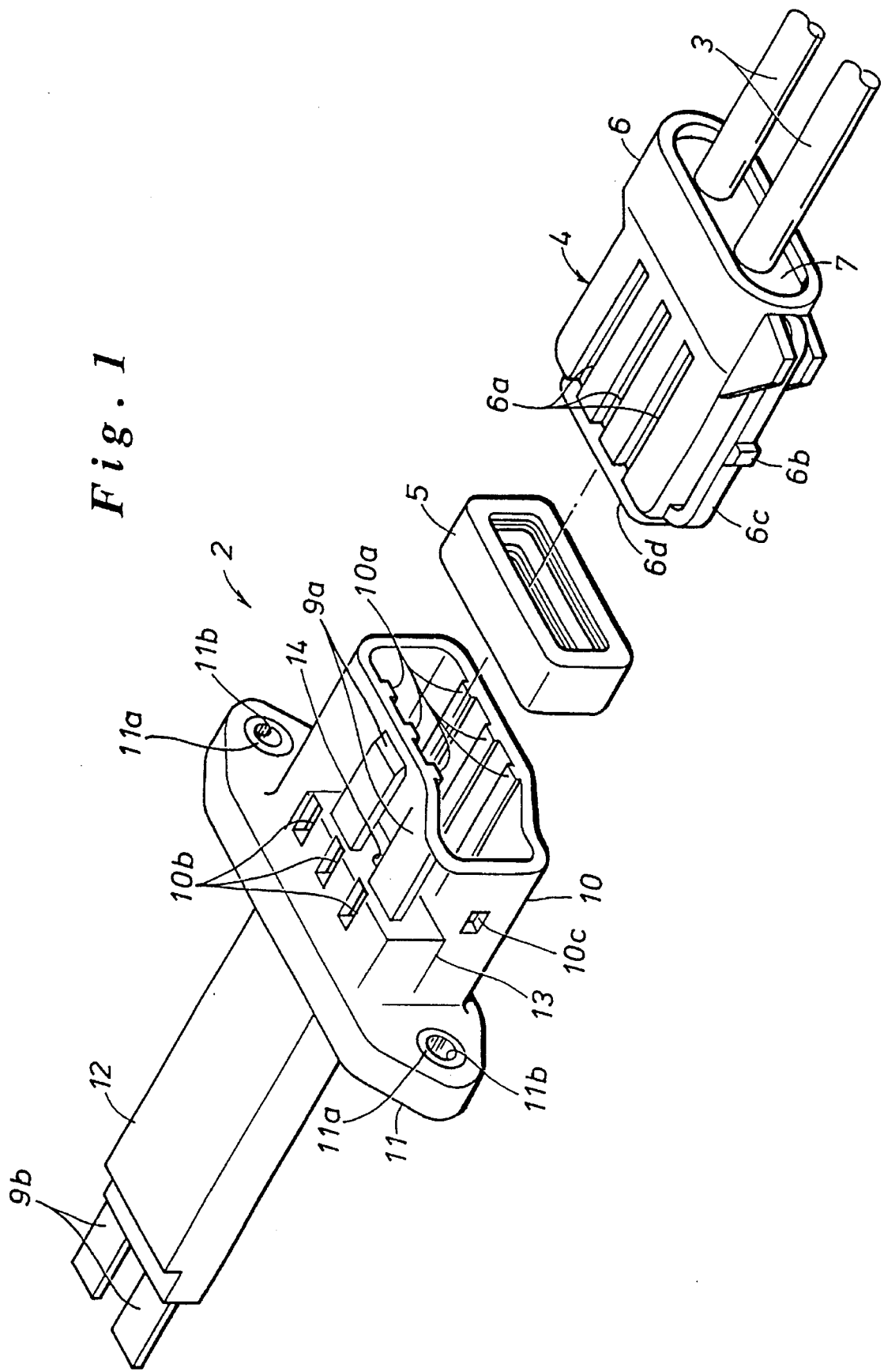
FIG. 1 is an exploded perspective view of an electric connector to which the present invention is applied.
Figure 3:
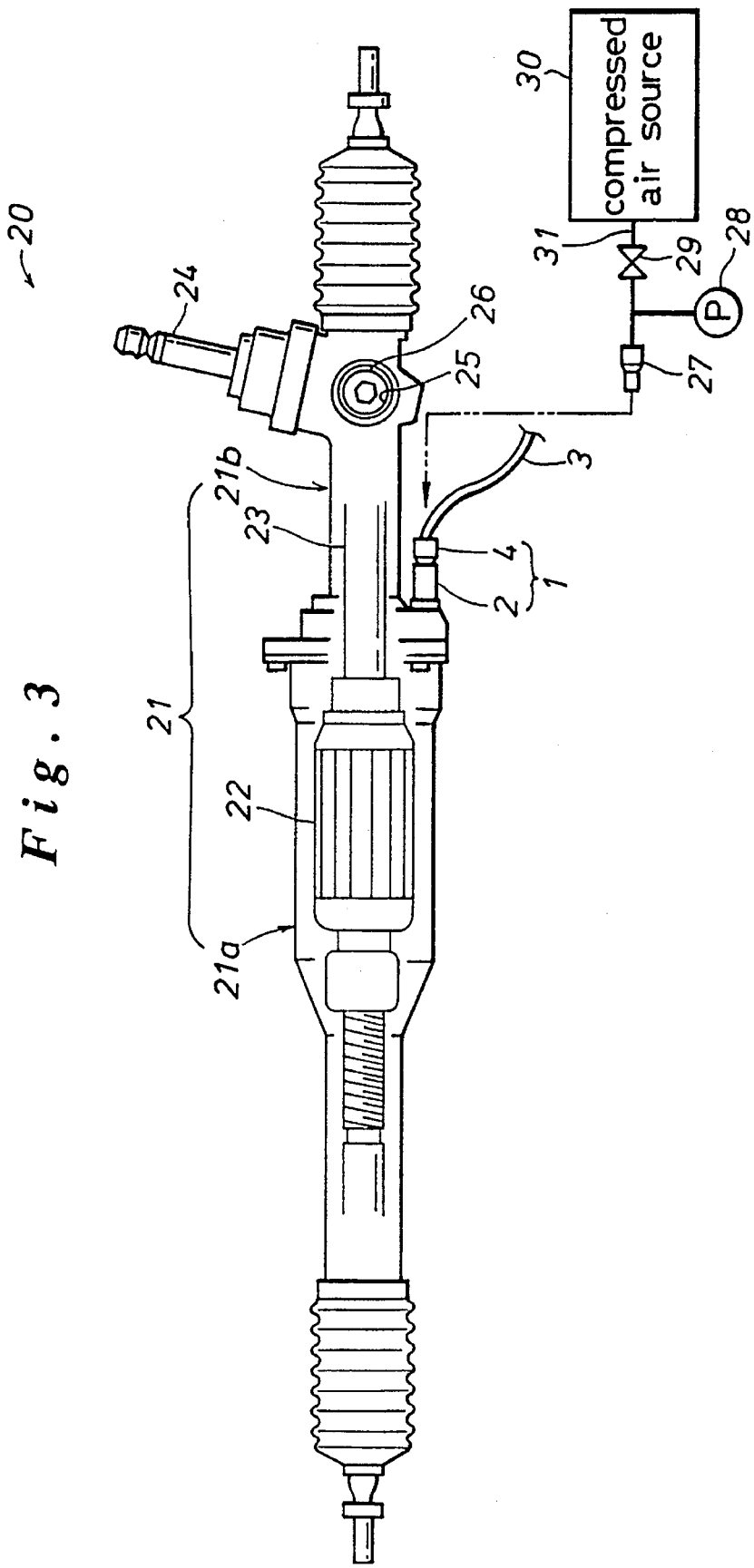
FIG. 3 is a see-through front view of a rack and pinion type electric power steering (EPS) device.

FIG. 1 illustrates an electric connector 1 which is provided in the gear housing 21b of the EPS device 20 which elements are illustrated in FIG. 3. This electric connector 1 comprises a housing-end connector half 2 attached to the gear housing 21b, a cable-end connector half 4 connected to a pair of electric wires 3 for supplying electric power to the motor of the EPS device 20, an annular rubber seal member 5 interposed between the two connector halves 2 and 4.

Figure 2:
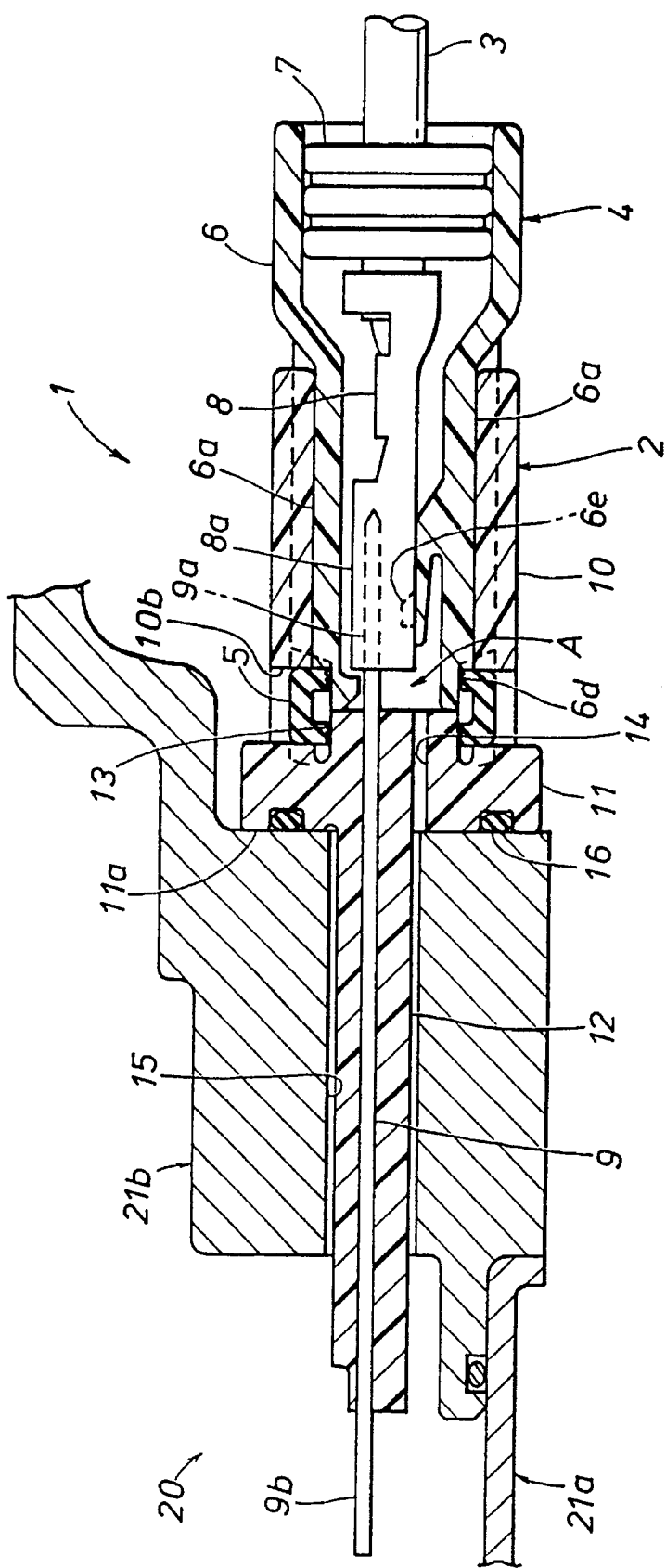
FIG. 2 is a longitudinal sectional view of the electric connector shown in FIG. 1.

The cable-end connector half 4 of the electric connector 1 comprises a somewhat flattened tubular casing 6 which is molded from synthetic resin material such as PBT, a wire seal rubber member 7 which is fitted into an outer axial end of the casing 6 and is provided with a pair of holes for passing the electric wires 3 therethrough, and a pair of socket terminals 8 having tubular receptacles 8a, each having a rectangular cross section, and electrically connected to the corresponding wires 3 (see FIG. 2). Each of the upper and lower outer surfaces of the casing 6 is provided with three longitudinal grooves 6a. Each side of the casing 6 is provided with an engagement claw 6b resiliently supported by a spring member 6c, both the claw 6b and the spring member 6c being integrally molded with the casing 6. The inner axial end of the casing 6 remote from the wires 3 defines an opening in which the receptacles 8a of the terminals 8 are disposed along the axial direction. The periphery of the open end of the casing 6 defines an annular axial projection 6d.

As more fully illustrated in FIG. 2, the socket terminals 8 attached to the corresponding ends of the electric wires 3 are retained in the casing 6 by engagement members 6e integrally molded in the interior of the casing 6, and are thereby prevented from dislodging from the interior of the casing 6. The wire seal rubber member 7 which is fitted onto the electric wires 3 is in turn press fitted into the corresponding open axial end of the casing 6, and prevents moisture or other foreign matter from entering the interior of the casing 6 by virtue of its resiliency.

The annular rubber seal 5 consists of an annular rubber member having a rectangular profile for instance made of silicone rubber, and is provided with a number of annular grooves in the inner circumferential surface thereof.

The housing-end connector half 2 of the connector 1 is provided with a casing which is integrally molded with synthetic resin material such as PBT, and a pair of connecting pins 9 which are insert molded therein. Outer ends of the connecting pins 9 serve as pin terminals 9a which are adapted to be fitted into the receptacles 8a of the socket terminals 8 while inner ends of the connecting pins 9 serve as pin terminals 9b which are adapted to be fitted into receptacles (not shown in the drawings) and to be thereby connected to the electric motor of the EPS device 20. The casing of the housing-end connector half 2 is provided with a tubular portion 10 which surrounds the pin terminals 9a, a mounting bracket 11 for mounting the housing-end connector half 2 on the gear housing 21b, and an extension 12 having the connecting pins 9 insert molded therein. The mounting bracket 11 is provided with a pair of mounting holes 11b each defined by a metallic collar 11a which is insert molded in the mounting bracket 11. The pin terminals 9b extending out of the connector casing extension 12 are connected to the brushes which engage the commentator of the motor rotor 22.

The upper and lower inner surfaces of the tubular portion 10 of the connector casing are each provided with three longitudinal ridges 10a which are adapted to be received by the corresponding longitudinal grooves 6a provided in the casing 6 of the cable-end connector half 4. The longitudinal ridges 10a are each provided with a break near the inner end thereof by an opening 10b which is passed through both the upper and lower walls of the tubular portion 10 of the connector casing. The breaks provided in the longitudinal ridges 10a jointly define an annular groove for retaining the seal member 5. Each side wall of the tubular portion 10 of the connector half 2 is provided with an opening 10c for engaging the corresponding claw 6b of the other connector half 4.

The inner end wall of the cavity A defined in the tubular portion 10 is provided with a rectangular projection 13, and the pin terminals 9a project out of the top end surface of the rectangular projection 13. An axial through hole 14 is passed through the rectangular projection 13 to communicate the interior of the gear housing 21b with the cavity A and, hence, with the exterior of the gear housing 21b (via the gap between the wall of the gear housing 21b and the extension 12).

The housing-end connector half 2 is fixedly secured to the gear housing 21b by threaded bolts passed through the holes 11b of the mounting bracket 11, with the extension 12 received in an opening 15 defined in the gear housing 21b. An O-ring 16 ensures a necessary sealing between the mounting bracket 11 and the gear housing 21b. The annular rubber seal member 5 is placed in the cavity A, and the inner end of the cable-end connector half 4 is pushed into the cavity A until the claws 6b on either side of the cable-end connector half 4 are engaged by the openings 10c provided in the side walls of the housing-end connector half 2. As a result, the pin terminals 9a are fitted into the corresponding receptacles 8a to thereby establish the electric connection of the connector 1.

In this condition, the rectangular projection 13 of the housing-end connector half 2 and the annular axial projection 6d of the cable-end connector half 4 are both fitted into the annular rubber seal member 5, which is at the same time compressed between the two connector halves 2 and 4. The annular rubber seal member 5 thus engages tightly around the outer surfaces of the rectangular projection 13 and the annular axial projection 6d while the outer end of the cable-end connector half 2 is sealed off by the wire seal rubber member 7 so that the cavity A is completely sealed from the exterior, and thereby prevented from intrusion of moisture or other foreign matter. The openings 10b are also sealed by the annular rubber seal member 5, and allow the presence of the annular rubber seal member 5 to be inspected by making it visible from the exterior.

The air-tightness of the EPS device 20 can be tested as described in the following. First of all, a testing head 27, having an external profile similar to the cable-end connector half 4 and connected to a pressure source 30 via a conduit 31 including a valve 29 and a pressure gauge 28, is fitted into the housing-end connector half 2 to introduce compressed air into the housing of the EPS device 20 via the conduit 31, the valve 29, the pressure gauge 28, and the testing head 27. The compressed air supplied by the testing head 27 is introduced through the axial through hole 14 and the gap between the extension 12 and the opening 15 of the gear housing 21b. Upon achieving a certain pressure in the housing of the EPS device 20, the valve 29 is closed, and the internal pressure of the EPS device 20 is measured with the pressure gauge 28 if there is any drop in the internal pressure of the interior of the housing over a prescribed time period.

If there is no detectable drop in the internal pressure, it means that the EPS device 20 is sufficiently air-tight. Then, the cable-end connector half 4 is fitted into the housing-end connector half 2 in place of the testing head 27. Once the two connector halves 2 and 4 are connected to each other, the annular rubber seal member 5 and the wire seal rubber member 7 ensure the air tightness of the interior of the EPS device 20. Because the two connector halves 2 and 4 can be connected to each other simply by pushing one into the other, the step of connecting the two connector halves is highly unlikely to impair the air tightness of the EPS device.

The present invention allows the test for air-tightness to be conducted after the electric device is fully assembled. Furthermore, the present invention can be implemented without requiring any major change to the existing devices. Thereby, the increase in the fabrication cost for the electric device is minimized while the air tightness of the electric device can be ensured in a simple and reliable manner.

Although the present invention has been described in terms of preferred embodiments thereof, it is obvious to a person skilled in the art that various alterations and modifications are possible without departing from the scope of the present invention which is set forth in the appended claims. For instance, axial grooves may be formed on the outer surface of the extension 12 to facilitate introduction of compressed air into the EPS device 20. Alternatively, the axial through hole 14 for introducing compressed air into the EPS device 20 can be passed all the way through the inner end of the extension 12. Similarly, the configuration of the connecting pins 9 is not limited by the illustrated embodiment, but may be selected from any of the known arrangements.

In the above described embodiment, the wire seal rubber member 7 sealed the gap between the wires 3 and the casing 6, but the same goal may be achieved by insert molding the corresponding ends of the socket terminals 8 in the casing 6 so that the outer ends of the socket terminals 8 may extend out of the material of the casing 6 and the need for the wire seal rubber member 7 may be eliminated. Also, the type of the connector that can be used for the present invention is not limited by the example given above. For instance, the female end of the casing was attached to the housing of the electric device, but it is also possible to attach the male end of the connector without departing from the spirit of the present invention.

What we claim is:

1. An arrangement for testing air-tightness of an electric device having an enclosed housing, and an electric connector fitted into an opening provided in said housing, said connector comprising:

a housing-end connector half having a casing which is fitted into said opening provided in said housing of said electric device in an air-tight fashion, a connecting pin extending between inner and outer ends of said housing-end connector half casing, and a communication passage passed through between inner and outer ends of said housing-end connector half casing;

a cable-end connector half having a casing which is adapted to be coupled with said housing-end connector half casing in an air tight fashion, a cooperating terminal retained in said cable-end connector half casing and adapted to be electrically connected to an outer end of said connecting pin when said two housing halves are coupled with each other, and lead means for establishing external electric connection to said cooperating terminal; and seal means for closing said communication passage when said two casings of said connector halves are coupled with each other.

2. An arrangement for testing air-tightness according to claim 1, wherein the casing of one of said connector halves comprises:

a cavity opposing the other one of said casings, the other casing being provided with a first annular projection adapted to be fitted into said cavity; and a second projection having a substantially identical cross sectional profile to said first annular projection and adapted to align with and abut said first annular projection in said cavity when said two casings are coupled with each other, said seal means comprising an annular resilient member which is received in said cavity to be fitted over both said first annular projection and said second projection when said two casings are coupled with each other.

3. An arrangement for testing air-tightness according to claim 1, wherein the casing of one of said connector halves comprises a cavity opposing the other connector half for receiving a part of the other casing therein, and said seal means comprising a resilient seal member which is received in said cavity and interposed between the casings of said two connector halves, the casing of the one connector half being provided with an opening which allows the seal member to be visible from the exterior but is sealed from the exterior by the seal member.

4. A method for testing air-tightness of an electric device having an enclosed housing, and an electric connector fitted into an opening provided in said housing, by using the arrangement set forth in claim 1, comprising the steps of:

fitting a testing head having an external configuration corresponding to said cable-end connector half and connected to a source of compressed gas into said housing-end connector half;

introducing compressed gas into said housing of said electric device from said testing head until a certain internal pressure is achieved in said housing of said electric device;

measuring an internal pressure of said housing of said electric device over a prescribed time period, and evaluating air-tightness of said housing of said electric device according to a change in said internal pressure; and removing said testing head from said housing-end connector half, and coupling said cable-end connector half with said housing-end connector half.

* * * * *